United States Patent Office 2,884,358
Patented Apr. 28, 1959

2,884,358

PROCESS FOR PREPARING CRUDE HEPARIN

Jess A. Bush, Long Beach, Leon D. Freeman, Bellflower, and Elliot B. Hagerty, Whittier, Calif., assignors to Southern California Gland Co., Los Angeles, Calif., a copartnership consisting of Nathan A. Wolfstein, Sr., and Nathan A. Wolfstein, Jr.

No Drawing. Application April 22, 1957
Serial No. 654,082

11 Claims. (Cl. 167—74)

This invention relates to the preparation of heparin and has particular reference to the preparation of crude heparin from animal tissues.

One of the principal objects of the present invention is to provide a novel and improved process for the preparation of crude heparin.

Many approaches have heretofore been used to extract and isolate heparin from tissue. Howell,[1] who pioneered in this field, extracted dried liver tissue with hot alcohol to partly de-fat the tissue, and then with physiological saline to remove the heparin, which was then precipitated with acetone. This was then deproteinized with cadmium chloride. Later he used Lloyd's reagent and purified through the barium salt.

Scott and Charles[2] developed the process which has been the basis for much of the later work. Their procedure consisted of an alkaline extraction of the minced tissue using alkaline ammonium sulfate and heat. The crude heparin was precipitated by acidifying to pH 2. The proteins were digested with trypsin.

Kuizenga and Spaulding[3] have used basically the same technique but have introduced autolysis of the tissue before extraction, which greatly improved the yields. Their method of purification was improved, though based on the previous work cited.

Recently there have been a number of techniques published, most of which are only minor variations on those above.

The published methods for the isolation of heparin have certain weaknesses. First, a single extraction may not be adequate to obtain a satisfactory yield. Second, an acid precipitation will not drop out all the heparin. Third, the tissue does not always provide enough enzymes to result in adequate autolysis, depending on how the tissue was handled. Fourth, the control of bacterial contamination has not been satisfactory. This contamination will introduce undesirable odor, color and pyrogens, and consequently reduce the yield.

An important object of the present invention is to provide a process for the isolation of heparin from animal tissues which overcomes the above and other disadvantages of the prior art. More specifically, it is an object of the present invention to provide a heparin production process which is simple to carry out yet which results in high yields of active material.

Other objects and advantages of the present invention, it is believed, will be readily apparent from the following detailed description of preferred embodiments thereof.

Briefly, the process, of the present invention includes the steps of autolysis (preferably in the presence of a proteolytic enzyme where lung is used as a raw material), alkaline extraction, digestion in the presence of proteolytic enzyme, formation of an hydrophobic heparin complex, flotation of the complex with a water immiscible solvent, separation of the complex (solid phase) from the two liquid phases, separation of the complex by precipitation in alcohol, and removal of the alcohol. The separation of the heparin from the extract solution by complexing and flotation is an important and novel step in the process of the present invention.

The process of the present invention is adapted to utilize as a raw material the tissue of any animal suitable for food for human consumption. Most suitable tissues are lung and the small intestine of beef. Lung is more expensive than intestine but gives a considerably higher yield. Lung is also more advantageous than intestine from the standpoint that it is easier to store in a satisfactory condition prior to use. Lung can be used either fresh or frozen, and frozen storage has no known adverse effects on yield or handling. The tissue should be finely divided, but not homogenized, for use in the process.

In carrying out the process, the tissue is first autolyzed by subjection to a temperature of 20–40° C. for 14–20 hours, with gentle agitation. This autolysis step should be carried out in the presence of an overlay of a preservative comprising a bacteriostat or bacteriocide such as chloroform, toluene or other aromatic compounds or combinations thereof, phenolics, or antibiotics. The autolysis thus far described is conventional. However, when working with beef lung it has been found advantageous to add a small amount of a proteolytic enzyme such as beef pancreas, trypsin and the like. The amount of pancreas may vary from 0–5% by weight of the total raw materials, according to the prior treatment and condition of the tissue used. Tissues such as intestine do not require the added enzyme since they naturally possess substantial quantities of enzyme.

Following autolysis, the tissue is extracted with an alkaline extractant, preferably within the pH range of 8–10. The preferred alkaline buffer is ammonium acetate, but other ammonium salts such as the chloride, sulfate, salts of other organic acids such as the propionate, and other amine salts such as methyl amine acetate may also be used. The extraction is preferably carried out in the classical manner by heating to 55–60° C. for about two hours, then rapidly to about the boiling point, followed by removal of heat. Agitation during the extraction is necessary, the purpose of the heating being to coagulate the tissue.

The heparin-containing aqueous extract is then separated from the solids by filtration, preferably utilizing a filter aid, and the filtrate digested at about 30–45° C. in the presence of a proteolytic enzyme, the pH of the material undergoing digestion being in the range of 7–9. The digestion must go to as near completion as possible. This normally requires about 3 days with additional increments of enzymes added at periodic intervals. A preservative as used in the autolysis is also preferably present during digestion.

Many proteolytic enzymes such as trypsin, bacterial, fungal, plant and animal proteinases may be used with suitable adjustment of pH for optimum effect. It is preferred, however, to use about 5–15 gal. per 1000 pounds of original tissue, of a pancreatic extract prepared by extracting finely ground pancreas with 2 volumes of 0.25 N acetic acid, permitting the mixture to stand in the cold for 24 hours, followed by filtration. The extract is stable for some time if kept in the cold.

Following the digestion period, the batch is heated to just below the boiling point, then rapidly cooled to room temperature, filtered and, preferably, the filtrate is assayed for heparin content.

---

[1] William H. Howell: American Journal of Physiology, volume 63, page 434 (1922).
[2] A. F. Charles and D. A. Scott: Journal of Biological Chemistry, volume 102, page 425 (1933).
[3] M. F. Kuizenga and L. B. Spaulding: Journal of Biological Chemistry, volume 148, page 641 (1943).

To the clarified filtrate is added a flotation agent. As used herein, the term "flotation agent" is intended to mean and include any basic substance or compound which will complex with heparin and form an insoluble or hydrophobic substance, including but not limited to the following: primary amines containing at least 6 carbon atoms, such as hexylamine, octylamine, decylamine, laurylamine and the other fat derived amines; phenyl alkyl amines, such as phenyl ethyl amine; alkaloids such as brucine; basic dyes such as toluidine and Azure A; butacaine, procaine and related compounds; protamine, polylysine and other very basic peptides or proteins. Primary amines containing unsaturated carbon-to-carbon linkages are suitable, as are amines containing branched chains, so long as the branching in the chain does not occur too close to the amine group. In this latter connection, the amine must include the characteristic organic grouping

—CH$_2$—CH$_2$—NH$_2$

The amount of flotation agent may vary widely but, for best results and for reasons of economy, should be maintained within the range of 200–1000 gm. per 1,000,000 units of heparin in the solution.

The pH of the mixture is adjusted to about 5–7.5 with acetic acid, and to the solution is added 2–5 gallons, per 100 gallons of mixture, of a water immiscible organic liquid in which the heparin-amine complex is insoluble. Suitable liquids are ketones such as methyl isobutyl ketone, ethyl amyl ketone; esters such as ethyl acetate, amyl acetate; alcohols such as amyl alcohol; hydrocarbon solvents such as hexane, benzene; chlorinated solvents such as chloroform, carbon tetrachloride.

The mixture is thoroughly agitated and then allowed to stand for several hours or overnight. All of the heparin activity is in the complex precipitate which collects at the interface between the aqueous phase and the organic liquid phase. The precipitate occludes some of the aqueous phase and some of the organic liquid, forming a third phase or interphase. The aqueous phase is drawn off and the precipitate phase separated from the bulk of the remaining organic phase and treated with several volumes of a complex-breaking agent selected from water miscible solvents in which heparin is insoluble such as methanol, ethanol, isopropanol, acetone, formamide, dimethylformamide, dioxane, propylene glycol, the Cellosolves and the like. The mixture is warmed to about 70° C., the pH adjusted to about 9.5–12 and allowed to settle. The heparin complex is thus broken, the amine or other hydrophobic compound going into solution in the complex-breaking agent, the heparin being insoluble. The wet solids are separated, washed with methanol or one of the solvents listed immediately above, suspended in water, precipitated with methanol or one of said solvents and collected under vacuum to provide the final crude product. This product, heparin sodium, may be further purified in accordance with standard practice, preferably by the process disclosed in the copending application of Bush et al., Serial No. 621,217, filed November 9, 1956, entitled "Method For Purifying Sulfated Carbohydrates."

The following specific examples are illustrative of the process of this invention, but it is to be understood that the process is not to be limited thereto:

*Example 1*

5000 lbs. of beef intestine was introduced into a stainless steel reactor, jacketed with thermostated water and steam. 200 gallons of water and 10 gallons of chloroform were added. The mixture was agitated, the temperature was raised to 90° F. and the agitation stopped. 5 gallons of toluene was added and the vessel closed. Autolysis was continued for 17 hours.

The extractant solution, consisting of 30 gallons of glacial acetic acid, 35 gallons of 30% aqueous ammonia, 50% sodium hydroxide to adjust the pH to 9.6 at 80° F. and water to make to 300 gallons, was added to the tissue. With agitation, the temperature was raised to 60° C. and held there for 2 hours. Then steam was applied and the temperature was raised to boiling. 200 lbs. of coarse filter aid (perlite) was added and the mixture filtered through a string discharge vacuum filter. The cake was washed with 200 gallons of hot water on the filter.

The filtrate was allowed to stand overnight and the fat skimmed off the top. After cooling to 100° F., the filtrate was transferred to a tank with thermostated water and the temperature set at 95–100° F. 24 gallons of pancreatic extract, prepared as described above, was added in 4-gallon increments every 12 hours for 3 days. The batch was brought to a boil and cooled to room temperature.

The batch was then filtered into a vessel and assayed for heparin content. 40,000,000 units were found in 1000 gallons of filtrate. 20 kilograms of n-octylamine was added and 105 lbs. of glacial acetic acid was added to bring the pH to 6.5. 20 gallons of methyl isobutyl ketone was added and the whole mixture was vigorously agitated for 1 hour. The mixture was then allowed to stand overnight. The clear, aqueous phase was drained off and discarded. The grayish-brown interphase was then removed, together with a small amount of the ketone phase, and transferred into a small kettle. The interphase volume was 7 gallons. 30 gallons of methanol was added and the mixture warmed to 120° F. and then the pH was adjusted to 9.0. The mixture was then allowed to settle overnight. The solids were collected with vacuum and washed with 5 gallons of methanol. The cake was then suspended in 5 gallons of water and the heparin precipitated with 10 gallons of methanol. The solids were collected under vacuum. The dry weight of the cake was 1000 grams and the total units were 38,000,000.

*Example 2*

3000 lbs. of ground beef lung was introduced with 30 lbs. of ground beef pancreas into a reaction vessel equipped with thermostated water and steam. 120 gallons of water and 6 gallons of chloroform were added. The temperature was brought to 95° F. with agitation. 3 gallons of toluene was added after the agitation was stopped and the mixture was autolysed for 18 hours.

300 gallons of extractant solution as prepared in Example 1 was added and the temperature raised to 130° F. and held for 2 hours. Then the temperature was raised to 200° F. and the mixture filtered on a string discharge filter with 150 lbs. of coarse filter aid (perlite).

The filtrate (450 gallons) was cooled to 100° F. and held in a thermostated vessel at 100° F. Pancreatic extract was added in 3-gallon increments every 12 hours for three days. The batch was then brought to a boil and then cooled. The solution was filtered and assayed for activity. 36,000,000 units were found. 18 kilograms of n-octylamine was added and the pH adjusted to 6.5 with 100 lbs. of glacial acetic acid. 15 gallons of methyl isobutyl ketone were added and the mixture was agitated vigorously for 1 hour.

The clear liquid was drained off and the dark interphase was moved to a small kettle equipped with heat and agitation means. The volume was 6 gallons. 25 gallons of methanol was added and the mixture was heated to 120° F. The heat was removed, the pH adjusted to 9.0 with strong sodium hydroxide, and the batch allowed to stand overnight. The solids which settled out were collected with vacuum. The cake was resuspended in 5 gallons of water and reprecipitated with 10 gallons of methanol. The solids were collected under vacuum. The dry weight was 1000 grams. The activity was 34,000,000 units.

Having fully described our invention, it is to be understood that we do not wish to be limited to the details set

We claim:
1. In a process for the preparation of heparin which includes autolysis of animal tissue, alkaline extraction of the autolysate to form an aqueous, heparin-containing extract, and digestion of said extract with added enzymes, the steps comprising adding to the digested extract a flotation agent comprising a basic organic substance capable of forming with the heparin in said extract a hydrophobic heparin complex, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

2. In a process for the preparation of heparin which includes autolysis of animal tissue, alkaline extraction of the autolysate to form an aqueous, heparin-containing extract, and digestion of said extract with added enzymes, the steps comprising adding to the digested extract a flotation agent comprising a basic organic substance capable of forming with the heparin in said extract a hydrophobic heparin complex, adjusting the pH to between about 5 and 7.5, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

3. In a process for the preparation of heparin which includes autolysis of animal tissue, alkaline extraction of the autolysate to form an aqueous, heparin-containing extract, and digestion of said extract with added enzymes, the steps comprising adding to the digested extract a primary amine having at least six carbon atoms and including the organic grouping —$CH_2$—$CH_2$—$NH_2$ to form a hydrophobic heparin complex, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

4. In a process for the preparation of heparin which includes autolysis of animal tissue, alkaline extraction of the autolysate to form an aqueous, heparin-containing extract, and digestion of said extract with added enzymes, the steps comprising adding to the digested extract octylamine to form a hydrophobic heparin complex, adding to the complex thus formed methyl isobutyl ketone, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

5. In a process for the preparation of heparin which includes autolysis of animal tissue, alkaline extraction of the autolysate to form an aqueous, heparin-containing extract, and digestion of said extract with added enzymes, the steps comprising adding to the digested extract a flotation agent comprising a basic organic substance capable of forming with the heparin in said extract a hydrophobic heparin complex, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, adding to said heparin complex a water-miscible solvent in which heparin is insoluble and in which the flotation agent is soluble to break the complex, and mechanically separating the heparin as insolubles therefrom.

6. In a process for the preparation of heparin which includes autolysis of animal tissue, alkaline extraction of the autolysate to form an aqueous, heparin-containing extract, and digestion of said extract with added enzymes, the steps comprising adding to the digested extract octylamine to form a hydrophobic heparin complex, adding to the complex thus formed methyl isobutyl ketone, agitating the mixture and allowing it to stand for a sufficient length of time to permit the formation of three layers comprising an aqueous phase, an organic liquid phase and an interphase of said heparin complex, mechanically separating said interphase from the other phases, adding a complex-breaking agent comprising methanol to said heparin complex, and mechanically separating the heparin as insolubles therefrom.

7. A process for the preparation of heparin comprising the steps of autolyzing beef lung tissue in the presence of a proteolytic enzyme, extracting the autolysate with an alkaline aqueous extractant to form an aqueous, heparin-containing extract with added enzymes, digesting said extract, adding to the digested extract a flotation agent comprising a basic organic substance capable of forming with the heparin in said extract a hydrophobic heparin complex, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

8. A process for the production of heparin comprising the steps of autolyzing beef lung tissue in the presence of a proteolytic enzyme, extracting the autolysate with an aqueous solution of sodium hydroxide and ammonium acetate having a pH of between about 8 and about 10 to form an aqueous, heparin-containing extract, digesting said extract in the presence of a proteolytic enzyme, adding to the digested extract from 200–1000 gm. per 1,000,000 units of heparin in the extract of octylamine, adjusting the pH to between about 5 and about 7.5, adding to the mixture thus formed about 2–5 gallons, per 100 gallons of mixture, of methyl isobutyl ketone, agitating the mixture and allowing it to stand for a sufficient length of time to permit the formation of three layers comprising an aqueous phase, an organic liquid phase and an interphase comprising said heparin complex, mechanically separating said interphase from the other phases, adding several volumes of methanol to said heparin complex, warming the mixture thus formed, adjusting the pH of the mixture to between about 9.5 and about 12, and mechanically separating the heparin as insolubles therefrom.

9. In a process for the preparation of heparin, the steps comprising adding to a heparin extract a flotation agent comprising a basic organic substance capable of forming with the heparin in said extract a hdrophobic heparin complex, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

10. In a process for the preparation of heparin, the steps comprising adding to a heparin extract a primary amine having at least six carbon atoms and including the organic grouping —$CH_2$—$CH_2$—$NH_2$ to form a hydrophobic heparin complex, adjusting the pH to between about 5 and 7.5, adding to the complex thus formed a water-immiscible organic liquid in which the heparin complex is insoluble, agitating the mixture and allowing it to stand for a sufficient length of time to permit the formation of three layers comprising an aqueous phase, an organic liquid phase and an interphase of said heparin complex, mechanically separating said interphase from the other phases, and separating the heparin from said interphase.

11. In a process for the preparation of heparin, the steps comprising adding to a heparin extract octylamine to form a hydrophobic heparin complex, adjusting the pH to between about 5 and 7.5, adding to the mixture thus formed methyl isobutyl ketone, agitating the complex and allowing it to stand for a sufficient length of time to permit the formation of three layers comprising an aqueous phase, an organic liquid phase and an interphase of said heparin complex, mechanically separating said interphase from the other phases, and separating the heparin from said interphase.

References Cited in the file of this patent
UNITED STATES PATENTS
2,552,507   O'Keeffe _____ May 15, 1951